Figure 1:
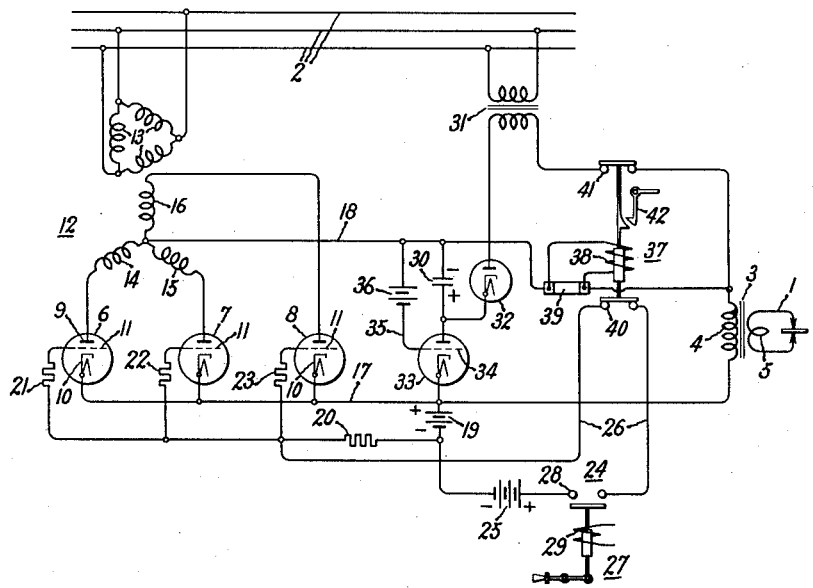

March 17, 1942.  G. L. ROGERS  2,276,796

ENERGY STORAGE WELDING SYSTEM

Filed May 2, 1941

Inventor:
George L. Rogers,
by Harry E. Dunham
His Attorney.

Patented Mar. 17, 1942

2,276,796

UNITED STATES PATENT OFFICE 2,276,796

ENERGY STORAGE WELDING SYSTEM

George L. Rogers, Schenectady, N. Y., assignor to General Electric Company, a corporation of New York Application May 2, 1941, Serial No. 391,508

14 Claims. (Cl. 171—97)

My invention relates to electric energy storage systems and more particularly to electric valve translating apparatus wherein energy is transmitted to a load circuit, such as a welding circuit, through apparatus including an inductance, and wherein the stored electromagnetic energy of the inductance is transmitted to the load circuit.

With the ever increasing application of electric valve apparatus to circuits which require the transmission of a predetermined amount of energy to a load circuit in response to a controlling operation, it has been found that electric valve apparatus is suited for applications of this nature because of the facility of control afforded by apparatus of this nature. For example, in electric welding systems it has been found that electric valve equipment, particularly electric valves, or electric discharge devices, which employ ionizable mediums are highly satisfactory for delivering to the welding circuit a desired amount of energy. Furthermore, because of the facility of electric valve control apparatus it is possible to control or adjust the amount of current and power transmitted to a particular welding circuit without involving auxiliary control apparatus of a complicated and expensive nature. In accordance with the teachings of my invention described hereinafter, I provide a new and improved electric valve translating system wherein an appreciable amount of energy is transmitted to a load circuit, and wherein the system is capable of wide application by the use of apparatus of simple construction and arrangement.

It is an object of my invention to provide a new and improved electric valve translating system.

It is another object of my invention to provide a new and improved electric valve translating system which effects the transmission of a predetermined amount of energy to a load circuit such as a welding circuit by transferring the stored electromagnetic energy of an inductance to the load circuit.

It is a further object of my invention to provide a new and improved electric valve translating system for energizing a load circuit or for transmitting to the load circuit an impulse of current of predetermined magnitude and duration, and wherein the translating equipment is energized from a suitable source of alternating current, and includes means for interruption of the current through the inductance by means of equipment which does not impose severe operating conditions on the translating apparatus.

Briefly stated, in the illustrated embodiment of my invention I provide an electric translating system for transmitting an impulse of current to a load circuit, such as a welding circuit, from an alternating current supply circuit through electric valve translating equipment which transmits unidirectional current to an inductance. The stored electromagnetic energy of the inductance is dissipated in or transferred to the load circuit by interrupting the flow of current through the inductance. I provide suitable commutating or current transfer means associated with the electric valve equipment and the inductance to effect this desired energy transfer without imposing severe operating conditions upon the translating equipment, and by using apparatus of relatively small size and rating as compared with the amount of power delivered to the welding or load circuit.

For a better understanding of my invention reference may be had to the following description taken in connection with the accompanying drawing, and its scope will be pointed out in the appended claims.

Figure 2:
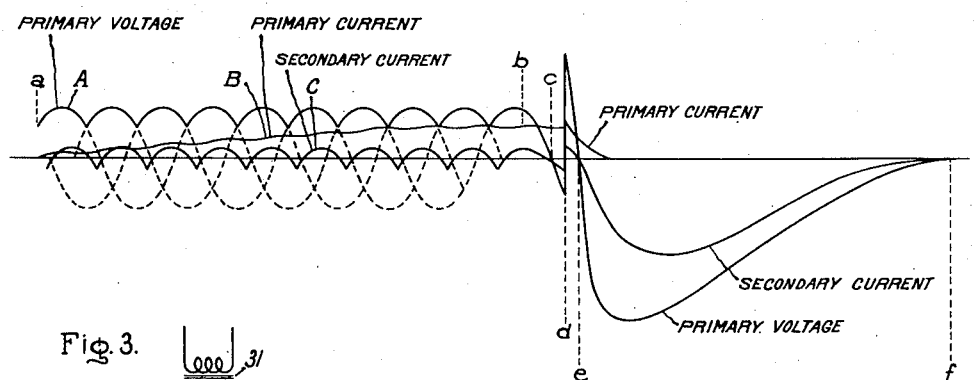
Figure 3:
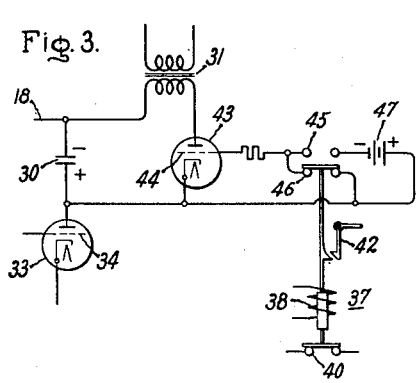

Fig. 1 of the accompanying drawing diagrammatically illustrates an embodiment of my invention as applied to an electric translating system for energizing a load circuit such as a welding circuit from a polyphase alternating current source, and Fig. 2 represents certain operating characteristics of the arrangement shown in Fig. 1. Fig. 3 represents a modification of the arrangement of Fig. 1.

Referring now to Fig. 1, my invention is there diagrammatically illustrated as applied to an electric translating system for transmitting energy to a load circuit such as a welding circuit 1 from a suitable source of alternating current 2 which may be a polyphase alternating current circuit of commercial frequency. The translating apparatus includes an inductance which is energized by unidirectional current, and the stored electromagnetic energy is transferred to the welding circuit 1 by interrupting the flow of current through the inductance. In the system illustrated, the inductance may be furnished by a transformer, such as a transformer 3 comprising a primary winding 4 and a secondary winding 5 connected to the welding circuit 1. Although the inductance in the illustrated embodiment of the invention has been shown as furnished by a transformer, it will be understood that other forms of inductance may be employed, and that other equipment for transforming electromagnetic energy may also be employed.

I provide electric valve translating equipment for transmitting unidirectional current to the primary winding 4 of transformer 3. More particularly, I provide a plurality of electric valve means 6, 7, and 8 which are preferably of the type employing an ionizable medium such as a gas or a vapor capable of supporting an arc discharge, and each includes an anode 9, a cathode 10, and a control means, control member, or control grid 11. In the usual commercial embodiment of electric valve equipment employing ionizable mediums, the control means, such as the grids 11, may be employed to hold off or prevent the conduction of current by the electric valve means by impressing thereon potentials sufficiently negative with respect to the cathode, and the control means may be used to initiate the discharge of current between the anodes and the cathodes by raising the potential of the control means, that is, by making it less negative or more positive with respect to the potential of the cathode. In electric valve equipment of this nature it will be appreciated by those skilled in the art that in the ordinary commercial embodiments after an arc discharge has been established between the anode and the cathode, current continues to flow until the anode-cathode circuit is interrupted or until the cathode is made positive in potential relative to the anode by an amount sufficient to effect the interruption of current.

I also employ a plurality of electrically displaced windings or phase windings which may be energized from the alternating current circuit 2 and each of which is associated with a different one of the electric valve means 6, 7, and 8. These electrically displaced windings may be furnished by a transformer 12 having a plurality of primary windings 13 and a plurality of secondary windings 14, 15, and 16 connected to electric valve means 6, 7, and 8 respectively. The transformer 12 and the associated electric valve equipment serve as a source of unidirectional current and voltage and supply unidirectional current and voltage to a direct current source including a positive conductor 17 and a negative conductor 18.

Where the electric valve means 6, 7, and 8 are of the type comprising grids 11 for controlling the conductivity thereof, and where it is desired to maintain the electric valve means non-conducting except during predetermined intervals, I provide a suitable source of negative unidirectional biasing potential such as a battery 19 which may be connected to grids 11 through resistances 20 and resistances 21, 22, and 23. In order to render the electric valve means 6, 7, and 8 conducting, and to effect the transmission of current to winding 4, it is necessary to raise the potential of the grids 11, and this may be effected by any suitable excitation means for providing a positive firing voltage such as that furnished by a battery 25 which may be connected to grids 11 through circuit 26. The excitation means includes a suitable circuit controlling means 27 such as an initiating switch or relay. Circuit 26 may be connected to the common juncture of resistance 20 and resistances 21—23. The circuit controlling means 27 may be either manually operated or automatically operated, and comprises contacts 28 and may include an actuating coil 29 which is energized in response to a predetermined circuit controlling operation of associated apparatus, such as an associated welding machine (not shown) to effect the desired sequential operation.

I provide commutating means connected to electric valve means 6, 7 and 8 and connected to primary winding 4 of transformer 3 to interrupt the flow of current through this apparatus and to effect the transfer of at least a portion of the stored electromagnetic energy in the inductance of transformer 3 to the welding circuit 1. The commutating means may comprise suitable apparatus for impressing on or introducing in the energizing circuit for primary winding 4 a suitable opposing voltage which effects the interruption of the current flowing through this winding. More particularly, I employ a capacitance 30 which is charged to the polarity indicated by means of a charging circuit including a transformer 31, and a unidirectional conducting device 32. Of course, it is to be understood that the capacitance 30 may be charged from any suitable source of direct current if desired. An electric discharge device 33 is connected in series relation with capacitance 30 across the direct current circuit including conductors 17 and 18. The electric discharge device 33 is also preferably of the type employing an ionizable medium and includes a control means or control grid 34 which controls the conductivity of the discharge device, that is, effects or initiates conduction, and serves also to maintain the discharge device non-conducting.

As a means for controlling the commutating means in response to the phase voltage of one of the phase windings 14—16 as reflected through the direct current circuit including conductors 17 and 18, I provide means for connecting the control grid 34 to one of the conductors of the direct current circuit, such as the negative conductor 18, through a circuit or conductor 35 which may include a suitable source of negative unidirectional biasing potential such as a battery 36.

A suitable current responsive device, such as a relay 37, is provided for preventing subsequent operation of the electric valve means 6, 7, and 8 and for rendering the excitation circuit 24 inoperative when the current transmitted to the primary winding 4 of transformer 3 attains a predetermined value. Of course, it is to be understood that other suitable equipment may be furnished for this purpose. The relay 37 may include an actuating coil 38 which is energized in response to the voltage appearing across a current responsive means such as a shunt 39 which is connected in series relation with winding 4. Relay 37 also includes contacts 40 and 41. Contacts 41 are connected in circuit 26 of excitation circuit 24 and when in the open circuit position prevent re-application of firing voltage to the grids 11 of electric valve means 6, 7, and 8 in response to a single controlling operation by circuit controlling means 27. Contacts 41 are connected in the charging circuit for capacitance 30 and hence prevent operation of the charging circuit after the current transmitted to winding 4 attains a predetermined value and also prevent operation during the commutation period. Relay 37 may be furnished with a trip-out means or mechanical lock 42 which maintains contacts 40 and 41 in the open circuit positions until relay 37 is manually reset or reset in response to some circuit controlling operation, in this way preventing a pumping action between the excitation circuit 24 and the current responsive relay 37.

The operation of the embodiment of my invention shown in Fig. 1 will be explained by considering the system when it is employed to transmit energy to the welding circuit 1 from the alternating circuit supply circuit 2 by transferring the stored electromagnetic energy of the inductance furnished by transformer 3 to the welding circuit 1. That is, an impulse of current is transmitted to the welding circuit 1 upon interruption of the current transmitted to the primary winding 4.

The system operation is initiated by circuit controlling means 27 which, when its contacts are closed, serves to render the electric valve means 6, 7, and 8 conducting by impressing on control grids 11 thereof a positive firing voltage provided by battery 25 through contacts 26 of circuit controlling means 27 and contacts 40 of relay 37. The voltage furnished by battery 25 is sufficient in magnitude to overcome the effect of the negative unidirectional biasing potential furnished by battery 19. Upon being rendered conducting electric valve means 6, 7, and 8, acting in conjunction with transformer 12, transmit polyphase rectified current to primary winding 4 of transformer 3. During this interval of time the current transmitted to the welding circuit 1 is not appreciable. When the primary winding current, that is, when the current transmitted to winding 4 by the electric valve translating apparatus, attains a predetermined value, current responsive relay 37 operates. When contacts 40 of relay 37 are open, subsequent conduction by the electric valves 6—8 is prevented, but of course, that electric valve which was last conducting, or which was conducting when the relay 37 opened its contacts, continues to conduct current until current is commutated therefrom by the commutating apparatus described immediately hereinafter.

The electric valve which continues to conduct after the operation of relay 37 conducts current until the voltage impressed on control grid 34 of electric discharge device 33 becomes sufficiently positive relative to its cathode to render discharge device 33 conducting. Upon being rendered conducting, discharge device 33 impresses a positive voltage on the cathodes 10 of all the electric valve means and consequently interrupts the flow of current through the electric valves, including the one which was last conducting. Furthermore, the positive voltage of capacitance 30, which is impressed on or introduced in the circuit for primary winding 4 also serves to interrupt the flow of current through the primary winding 4 and consequently causes the transfer of the stored electromagnetic energy of transformer 3 to welding circuit 1. The capacitance 30 upon being connected to the positive conductor 17 supplies two components of current, one of which may be considered as a negative component of current sufficient to interrupt the flow of current through that electric valve means which was last conducting, and the other component of current is a circulating current which flows in the path including the anode-cathode circuit of electric discharge device 33, primary winding 4, shunt 39, and capacitance 30. Of course, after the capacitance discharges through this circuit the upper plate of capacitance plate 30 tends to become positive, and the lower plate negative, thereby causing the discharge device 33 also to become non-conducting. However, prior to this time the electric valves 6—8 inclusive have become non-conducting, and consequently the circuit for the primary winding 4 is interrupted effecting the transfer of the stored magnetic energy to the welding circuit 1.

The operating characteristic shown in Fig. 2 may be referred to in order to explain more fully the operation of the arrangement shown in Fig. 1. If it be assumed that the electric valve means 6—8 are rendered conducting at time $a$ by the closure of contacts 26 of circuit controlling means 27, the voltage applied to the primary winding 4 of transformer 3 is represented by curve A which is the characteristic three-phase rectified voltage. Upon application of voltage to the circuit, including primary winding 4, the primary current will increase along an exponential curve and may be represented by curve B. The secondary current, and hence the current transmitted to the welding circuit 1 is represented by curve C, and it will be noted that the magnitude of the current does not attain an appreciable value. The current responsive relay 37 may be considered as operating at a time $b$ when the current through the primary winding attains a predetermined value. It will be well understood by those skilled in the art that the electric valve means 6, 7, and 8 conduct current in a predetermined sequence determined by the order of phase rotation of the voltages of windings 14, 15, and 16, and that each electric valve means conducts current for substantially 120 electrical degrees. If the relay 37 opens its contacts at about time $b$ when the primary current attains a predetermined value, the negative biasing potential furnished by battery 19 is effective to maintain the electric valves 6 and 7 non-conducting, and even though the anode voltages or the voltages of the associated phase windings become more positive in potential with respect to the other associated windings, these electric valves will not conduct current. However, one of the electric valve means, such as electric valve means 8 which may be considered to be the electric valve which was conducting at the time relay 37 operated, will continue to conduct current even though its anode voltage becomes negative and impresses on positive conductor 17 a voltage determined by the anode voltage or the voltage derived from winding 16.

It will thus be apparent that as the conduction is maintained through electric valve means 8 due to the inductance of primary winding 4, a time will arrive at which the phase voltage passes through the zero value and enters into the negative half cycle, such as at time $c$. At this time, and at times subsequent thereto, it will be apparent that the cathode of the electric discharge device 33 is being lowered in potential relative to the control grid 34 and when the potential difference becomes sufficiently great, the electric discharge device 33 will be rendered conducting. For example, when the voltage impressed on conductor 17 by electric valve means 8 becomes sufficiently negative to lower the potential of the cathode of electric discharge device 33 sufficiently to overcome the effect of battery 36, electric discharge device 33 will be rendered conducting at time $d$. The positive voltage of capacitance 30 is impressed on conductor 17 which accomplishes the above stated two functions; namely, the interruption of the current through electric valve means 8 and the interruption of current through the primary winding 4. The positive voltage due to the positive charge on the lower plate of capacitance 30 raises the potential of cathode 10 sufficiently high to interrupt the flow of current through electric valve means 8, and the capacitance also discharges through electric discharge device 33, primary winding 4, and shunt 39. The capacitance must be of such size and be charged to a suitable voltage to maintain the cathode positive for a period of time equal to, or greater than, the de-ionization time of the electric valve means 8, so that current flow is not reestablished through the electric valves immediately subsequent to or during the commutation interval. At time e, after the capacitance 30 has discharged through the above-described circuit, it is important in order to obtain the desired operation that the hold-off voltage for the electric valve means 6—8 be effective, and that the electric valve means are completely de-ionized, so that the circuit for primary winding 4 is completely interrupted, thereby effecting transfer of energy to the welding circuit 1 during the interval e—f.

Instead of using an electric valve employing two principal electrodes, such as electric valve 32 in Fig. 1, for charging the capacitance 30, I may employ as shown in Fig. 3 an electric discharge device of the controlled type, such as electric discharge device 43, having a control member or grid 44. A control circuit is provided for controlling the conductivity of the discharge device 43 and may be controlled by the relay 37. In this embodiment of my invention, the relay 37 may be provided with two sets of contacts 45 and 46 in addition to contacts 40, the former set of which are open and the latter of which are closed when the relay 37 is deenergized. The electric discharge device 43 may be chosen so that with the contacts 46 closed current is transmitted between the anode and cathode of electric discharge device 43 and with contacts 45 closed and contacts 46 open a negative unidirectional biasing potential is impressed on grids 44 by suitable means such as a battery 47.

The modification of my invention shown in Fig. 3 operates in substantially the same way as that explained above in connection with Fig. 1. During the cycle of operation, when the primary current attains a predetermined value, relay 37 operates to initiate operation of the commutating means. In addition, by virtue of the closure of the contacts 45 and opening of contacts 46, the charging current for the capacitance 30 is prevented from operating by impressing on the grid 44 of electric discharge device 43 a negative or hold-off voltage. Of course, the hold-off voltage is impressed on the grid 44 until the relay 37 is reset. Upon resetting relay 37, contacts 45 are opened and contacts 46 closed, raising the potential of grid 44 so that the capacitance 30 is charged from transformer 31 through electric discharge device 43.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a source of alternating current, a load circuit, means connected to said load circuit and comprising an inductance, rectifying means for transmitting current from said source to said inductance, and means for interrupting the flow of current through said inductance to transfer at least a portion of the stored electromagnetic energy of said inductance to said load circuit and comprising a capacitance, means for charging said capacitance and means for connecting said capacitance across said inductance to interrupt the flow of current through said inductance.

2. In combination, an alternating current supply circuit, a load circuit, an inductance connected to said load circuit, an electric translating apparatus for transmitting unidirectional current to said inductance and comprising at least two electric valve means each having a control member for controlling the current transmitted thereby, commutating means for interrupting the flow of current through said electric valve means and said inductance thereby effecting the transfer of at least a portion of the electromagnetic energy stored in said inductance to said load circuit, and means for impressing on said control members a hold-off voltage thereby causing one of the electric valve means to conduct current into its negative half cycle of voltage derived from said supply circuit, and for initiating an operation of said commutating means.

3. In combination, an alternating current supply circuit, a load circuit, an inductance connected to said load circuit, electric translating apparatus for transmitting unidirectional current to said inductance and comprising an electric valve means comprising control means for controlling the current conducted thereby, means for impressing on said control means a voltage tending to maintain said electric valve means non-conducting, and initiating means for superimposing on said control means a voltage to cause said electric valve means to conduct current to said inductance, and means responsive to the magnitude of current transmitted to said inductance for effecting interruption of the current through said electric valve means and said inductance thereby effecting transfer of at least a portion of the electro-magnetic energy stored in said inductance to said load circuit.

4. In combination, an alternating current supply circuit, a load circuit, an inductance connected to said load circuit, electric translating apparatus for transmitting undirectional current to said inductance and comprising electric valve means comprising control means for controlling the current conducted thereby, excitation means for said control means, commutating means comprising a capacitance for effecting interruption of the current conducted by said electric valve means and said inductance, means for charging said capacitance, means for connecting said capacitance across said inductance and for interrupting the flow of current through said inductance, thereby effecting transfer of at least a portion of the energy stored in said inductance to said load circuit, and means responsive to the current of said inductance for initiating operation of said commutating means.

5. In combination, an alternating current supply circuit, a load circuit, an inductance connected to said load circuit, electric translating apparatus for transmitting unidirectional current to said inductance and comprising a plurality of electric valve means each having a control member for controlling the current conducted thereby, initiating means for rendering said electric valve means conducting by impressing on the control members a suitable voltage, means for interrupting the current through said inductance comprising a capacitance, means for charging said capacitance and means for connecting said capacitance across said inductance thereby effecting transfer of at least a portion of the energy stored in said inductance to said load circuit, and means responsive to the current transmitted to said inductance for rendering said initiating means ineffective after a single operation of said initiating means.

6. In combination, an alternating current supply circuit, a load circuit, an inductance connected to said load circuit, electric translating apparatus for transmitting unidirectional current to said load circuit and comprising a plurality of electric valve means each having a control member for controlling the current conducted thereby, initiating means for rendering said electric valve means conducting by impressing on the control members a suitable voltage, and commutating means for interrupting the flow of current through said electric valve means and said inductance thereby effecting the transfer of at least a portion of the energy stored in said inductance to said load circuit, and means responsive to the current transmitted through said inductance for rendering said initiating means ineffective.

7. In combination, an alternating current supply circuit, a load circuit, an inductance connected to said load circuit, electric translating apparatus for transmitting unidirectional current to said inductance and comprising a plurality of phase windings and a plurality of associated electric valve means each having a control member for controlling the current conducted thereby, commutating means connected across said inductance and comprising in series relation a capacitance and a control electric discharge device having a grid, means for charging said capacitance, means for impressing a voltage on said control members to cause said electric valve means to conduct current to said inductance, means for superimposing on said control member a hold-off voltage so that current is conducted by only one of said electric valve means during a cycle, thereby causing said electric discharge device to conduct current and impressing a commutating voltage on said electric valve means and said inductance causing the transfer of at least a portion of the electromagnetic energy stored in said inductance to said load circuit.

8. In combination, an alternating current supply circuit, a load circuit, an inductance connected to said load circuit, electric translating apparatus for transmitting unidirectional current to said load circuit and comprising a plurality of electrically displaced windings and a plurality of associated electric valve means of the type employing an ionizable medium and each having a control means for initiating the conduction of current thereby, commutating means for interrupting the flow of current through said electric valve means and said inductance and for effecting the transfer of at least a portion of the electromagnetic energy stored in said inductance to said load circuit, excitation means for energizing said control means to effect the transmission of current to said inductance, means responsive to the magnitude of the current transmitted to said inductance for controlling said excitation means to prevent initiation of conduction by said electric valve means after operation of the current responsive means, and means responsive to the voltage of the winding associated with the electric valve means which is last conducting for initiating operation of said commutating means.

9. In combination, an alternating current supply circuit, a load circuit, an inductance connected to said load circuit, electric translating apparatus for transmitting unidirectional current to said inductance and comprising electric valve means including control means for controlling the current conducted thereby, excitation means connected to said control means for initiating conduction of current by said electric valve means, commutating means for interrupting the flow of current through said electric valve means and through said inductance, and means for preventing subsequent conduction by said electric valve means after the current through said inductance attains a predetermined value.

10. In combination, an alternating current supply circuit, a load circuit, an inductance connected to said load circuit, electric translating apparatus for transmitting unidirectional current to said inductance and comprising electric valve means connected to said inductance, commutating means for rendering said electric valve means non-conducting and for effecting interruption of the current through said inductance to effect transfer of at least a portion of the energy stored in said inductance to said load circuit and comprising a capacitance which produces a commutating voltage, charging means for said capacitance, and means for preventing operation of said charging means during the commutation operation.

11. In combination, an alternating current supply circuit, a load circuit, an inductance connected to said load circuit, electric translating apparatus for transmitting unidirectional current to said inductance and comprising electric valve means connected to said inductance, commutating means for rendering said electric valve means non-conducting and for effecting interruption of the current through said inductance to effect transfer of at least a portion of the energy stored in said inductance to said load circuit and comprising a capacitance for producing a commutating voltage, a charging means for said capacitance, means for preventing operation of said charging means during the commutation operation, and reset means for rendering said charging circuit operative.

12. In combination, an alternating current supply circuit, a load circuit, an inductance connected to said load circuit, electric translating apparatus energized from said supply circuit and comprising electric valve means for transmitting unidirectional current to said inductance, said electric valve means including control means for initiating the conduction of current thereby, commutating means for interrupting the current transmitted by said electric valve means and said inductance, thereby effecting transfer of at least a portion of the stored electromagnetic energy to said load circuit, and comprising a capacitance, a charging circuit for said capacitance, and an electric discharge device for connecting said capacitance to said electric valve means and said inductance, said electric discharge device, excitation means for energizing the control means of said electric valve means to cause said electric valve means to transmit current to said inductance, initiating means connected to said excitation means, means responsive to the current transmitted to said inductance for preventing subsequent conduction by said electric valve means when the current attains a predetermined value and for rendering said discharge device conductive, means actuated by the current responsive means for preventing operation of the charging circuit, and reset means for placing said excitation means and said charging circuit in condition for subsequent operation.

13. In combination, an alternating current supply circuit, a load circuit, an inductance connected to said load circuit, electric translating apparatus for transmitting unidirectional current to said inductance and comprising electric valve means, commutating means for effecting interruption of the current conducted by said electric valve means and said inductance, thereby effecting transfer of at least a portion of the energy stored in said inductance to said load circuit, and means responsive to the current transmitted through said inductance for initiating operation of said commutating means.

14. In combination, an alternating current supply circuit, a load circuit, an inductance connected to said load circuit, electric translating apparatus for transmitting unidirectional current to said inductance and comprising electric valve means including control means for controlling the current conducted thereby, excitation means connected to said control means for initiating conduction of current by said electric valve means, commutating means for interrupting the flow of current through said electric valve means and through said inductance thereby effecting the transfer of at least a portion of the electromagnetic energy stored in said inductance to said load circuit, said commutating means comprising a capacitance and a charging circuit for said capacitance including an electric discharge device having a control member, and means responsive to the current transmitted through said inductance for initiating operation of said commutating means and for controlling the potential of said control member.

GEORGE L. ROGERS.

Disclaimer 2,276,796.—*George L. Rogers*, Schenectady, N. Y. ENERGY STORAGE WELDING SYSTEM. Patent dated Mar. 17, 1942. Disclaimer filed Feb. 27, 1948, by the assignee, *General Electric Company*.

Hereby enters this disclaimer to claims 10 and 11 of said patent.

[*Official Gazette March 30, 1948.*]